United States Patent
Avramidis et al.

(10) Patent No.: US 9,139,720 B2
(45) Date of Patent: Sep. 22, 2015

(54) STYRENE-BASED COPOLYMERS HAVING ACID MONOMER UNITS AND DISPERSIONS THEREOF

(75) Inventors: Kostas S. Avramidis, Charlotte, NC (US); William J. Kirk, Rock Hill, SC (US)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 13/879,351

(22) PCT Filed: Oct. 13, 2011

(86) PCT No.: PCT/IB2011/054533
§ 371 (c)(1),
(2), (4) Date: Jun. 24, 2013

(87) PCT Pub. No.: WO2012/049651
PCT Pub. Date: Apr. 19, 2012

(65) Prior Publication Data
US 2013/0289173 A1    Oct. 31, 2013

Related U.S. Application Data

(60) Provisional application No. 61/393,189, filed on Oct. 14, 2010.

(51) Int. Cl.
| | | |
|---|---|---|
| *C08L 9/06* | (2006.01) | |
| *C08L 95/00* | (2006.01) | |
| *C08K 3/20* | (2006.01) | |
| *C08K 11/00* | (2006.01) | |
| *C08F 212/08* | (2006.01) | |
| *C08F 2/22* | (2006.01) | |
| *C08L 25/10* | (2006.01) | |
| *C08L 47/00* | (2006.01) | |

(52) U.S. Cl.
CPC .............. *C08L 9/06* (2013.01); *C08F 212/08* (2013.01); *C08K 3/20* (2013.01); *C08K 11/00* (2013.01); *C08L 25/10* (2013.01); *C08L 47/00* (2013.01); *C08L 95/00* (2013.01); *C08L 95/005* (2013.01); *C08L 2205/02* (2013.01); *C08L 2205/025* (2013.01); *C08L 2555/20* (2013.01); *C08L 2555/28* (2013.01); *C08L 2555/80* (2013.01); *C08L 2555/84* (2013.01)

(58) Field of Classification Search
CPC ....... C08L 47/00; C08L 95/00; C08L 95/005; C08L 9/06; C08L 25/10; C08K 3/20; C08K 11/00; C08F 212/08; C08F 2/22
USPC .............. 524/556, 555, 501, 60, 68, 69, 559; 525/332.6, 329.3, 192

See application file for complete search history.

(56) References Cited

U.S. PATENT DOCUMENTS

| | | | |
|---|---|---|---|
| 5,045,576 A | 9/1991 | Roeck et al. | |
| 6,087,420 A * | 7/2000 | Planche et al. | 524/68 |
| 6,451,886 B1 | 9/2002 | Krivohlavek et al. | |
| 2007/0238825 A1 | 10/2007 | Takamura et al. | |
| 2008/0146719 A1* | 6/2008 | Yang et al. | 524/445 |
| 2009/0298998 A1* | 12/2009 | Takamura et al. | 524/556 |

FOREIGN PATENT DOCUMENTS

| | | |
|---|---|---|
| DE | 258918 | 8/1988 |
| DE | 3830679 | 9/1989 |
| JP | 2004352901 | 12/2004 |
| WO | 2007026704 | 3/2007 |
| WO | WO 2007026704 A1 * | 3/2007 |
| WO | 2012049650 | 4/2012 |

OTHER PUBLICATIONS

Abstract of JP 2004352901 (Dec. 16, 2004).
Abstract of WO 2007026704 (Mar. 8, 2007).
International Search Report, mailed Feb. 9, 2012, in International Application No. PCT/IB2011/054533.
Written Opinion, mailed Feb. 9, 2012, in International Application No. PCT/IB2011/054533.
International Preliminary Report on Patentability and Written Opinion, mailed Apr. 25, 2013, in International Application No. PCT/IB2011/054533.
International Search Report, mailed Feb. 9, 2012, in International Application No. PCT/IB2011/054531.
Written Opinion, mailed Feb. 9, 2012, in International Application No. PCT/IB2011/054531.
International Preliminary Report on Patentability and Written Opinion, mailed Apr. 16, 2013, in International Application No. PCT/IB2011/054531.
Abstract of WO 2007/026704 (published Mar. 8, 2007), accessed on May 23, 2013, from http://worldwide.espacenet.com.
Abstract of JP 2004/352901 (published Dec. 16, 2004), accessed on May 23, 2013, from http://worldwide.espacenet.com.
European Search Report dated Mar. 21, 2014, for related European Patent Application No. 11 832216.3.

(Continued)

*Primary Examiner* — Michael M Bernshteyn
(74) *Attorney, Agent, or Firm* — Meunier Carlin & Curfman LLC

(57) ABSTRACT

Styrene-based copolymers having acid monomer units, dispersions, preparation method and use thereof are provided. The styrene-based copolymer is prepared by polymerizing styrene, one or more acid monomers, and optionally butadiene at a temperature of 40° C. or greater and then is vulcanized. The obtained styrene-based copolymer is used in asphalt-based systems.

28 Claims, No Drawings

(56) References Cited

OTHER PUBLICATIONS

European Search Report dated Mar. 17, 2014, for related European Patent Application No. 11 832217.1.

Translation of WO 2007026704 from LexisNexis TotalPatent (accessed Sep. 4, 2014).

U.S. Appl. No. 13/879,326 and the prosecution history thereof.

Examination Report dated Dec. 5, 2014, for related European Patent Application No. 11 832 217.1.

* cited by examiner

STYRENE-BASED COPOLYMERS HAVING ACID MONOMER UNITS AND DISPERSIONS THEREOF

CROSS-REFERENCE TO RELATED APPLICATION

This application claims priority to U.S. Provisional Application Ser. No. 61/393,189, filed Oct. 14, 2010, which is incorporated herein by reference in its entirety.

BACKGROUND

Styrene-butadiene polymer dispersions are useful in the production of several products, including vehicle tires, carpet backing, adhesives, foams, paper coatings and asphalt emulsions. There are two common methods for producing styrene-butadiene copolymer dispersions: a low temperature method (i.e., cold polymerization) and a high temperature method (i.e., hot polymerization). The low temperature method of producing styrene-butadiene copolymer dispersions involves polymerizing styrene and butadiene monomers at temperatures typically between 5° C. and 25° C. in the presence of a surfactant and in the absence of a carboxylated acid comonomer to produce a "cold" styrene butadiene rubber (SBR) copolymer. The low temperature method can be used to make high molecular weight polymers without introducing excess crosslinking. Unlike the low temperature method, the high temperature method for producing styrene-butadiene copolymer dispersions involves polymerizing styrene and butadiene monomers at temperatures in excess of 40° C., and generally in the range of 50-95° C., in the presence of a surfactant and a carboxylated acid monomer.

The low temperature method of producing styrene-butadiene copolymer dispersions has generally been used for producing styrene-butadiene polymer dispersions for many of the above-described uses because it can be agglomerated to produce a high solids content dispersion typically in excess of 65% solids and can be crosslinked (i.e., cured) to increase the tensile strength of the SBR without significantly reducing its elongation. The hot polymerization method, on the other hand, generally is believed to be only useful for producing styrene-butadiene copolymer dispersions having a narrow particle size distribution and a solids content below 55% making the dispersions useful for products such as paper coatings where polymer solids greater than 60% are not required and where the presence of carboxylation provides latex particle stability in the high shear environments encountered in the production of such products. Therefore, the hot polymerization method has generally only been desirable for paper coatings and some low solids pressure sensitive adhesive applications.

One issue with low temperature SBR aqueous dispersions is that they generally cannot be used in hot mix asphalt formulations such as those used in road paving and asphalt shingle applications. Hot mix asphalt formulations for road paving must comply with the requirements set forth in the Strategic Highway Research Program (SHRP) including having a desired dynamic shear modulus and stiffness. High molecular weight non-carboxylated SBR aqueous dispersions produce an undesired increase in viscosity of the hot mix asphalt formulation, making it difficult to uniformly apply the formulation to a surface. Low molecular weight non-carboxylated latex polymers can produce lower viscosity hot mix asphalt formulations; however, they do not have the desired SHRP performance properties.

SUMMARY

A copolymer, a method of making a copolymer, and methods and compositions including a copolymer are disclosed. The copolymer is made using a high temperature method at a temperature of 40° C. or greater. In some examples, the copolymer comprises styrene and acid monomer units, i.e., is carboxylated, and can optionally include butadiene monomer units. In some examples, the copolymer is cured (vulcanized) such as by using a sulfur curing agent. The copolymer can include cis-1,4 butadiene units in an amount greater than 20% and trans-1,4 butadiene units in an amount less than 60% of the total number of butadiene units in the copolymer. In some embodiments, the weight ratio of styrene to butadiene monomer units in the copolymer is 20:80 to 80:20. The copolymer can be derived from only styrene, butadiene and acid monomers or can include other monomers (e.g., acrylonitrile or acrylamide) or molecular weight regulators. The copolymer can be provided in an aqueous dispersion and modified to have an overall cationic charge.

A method of making a copolymer is also disclosed, comprising polymerizing styrene and optionally butadiene in an aqueous medium at a temperature of 40° C. or greater to produce an uncured copolymer, wherein the polymerizing step occurs in the presence of acid monomers. The method can further include the step of curing the copolymer with a sulfur-based curing agent to produce a cured copolymer. In some embodiments, the polymerizing step occurs at a temperature of 50° C. or greater. The polymerizing step can include only styrene, butadiene and acid monomers or can include other monomers (e.g., acrylonitrile or acrylamide) or molecular weight regulators. The method can also include the step of modifying the copolymer dispersion to have an overall cationic charge. In some embodiments, the polymerization occurs in a single stage process.

A blend of copolymers is also disclosed comprising the high temperature polymerized co-polymer and a second styrene-butadiene copolymer. In some embodiments, the second styrene-butadiene copolymer can be a higher molecular weight styrene-butadiene copolymer polymerized at a temperature of less than 40° C. The blend of copolymers can be provided in water as an aqueous dispersion. For example, the blend can be prepared by mixing an aqueous dispersion comprising a high temperature polymerized copolymer and an aqueous dispersion of the second styrene-butadiene copolymer. In some embodiments, the blend is cured after the mixing of the copolymers. In some embodiments, the first copolymer dispersion can have at least one first surfactant and the second styrene-butadiene copolymer dispersion can have at least one second surfactant, wherein the at least one first surfactant and the at least one second surfactant can include at least one common surfactant.

A polymer-modified asphalt composition is also disclosed including asphalt and the high temperature copolymer. In some embodiments, the asphalt composition is substantially free of water and can have, for example, a viscosity of less than 2000 cp at 135° C. In some embodiments, the asphalt composition further comprises water and the asphalt and the copolymer are dispersed in the water with a surfactant to form an asphalt emulsion. The asphalt composition can have the copolymer present in an amount of from 0.5% to 30% based on the total solids content of the copolymer and the asphalt. The asphalt composition can have a second styrene-butadiene copolymer. In some embodiments, the second styrene-butadiene copolymer can have a weight ratio of styrene to butadiene monomer units of 20:80 to 80:20 and can be polymerized at a temperature of less than 40° C.

A method of producing a polymer-modified asphalt is also disclosed, comprising blending asphalt and an aqueous dispersion of the high temperature polymerized copolymer at a blending temperature exceeding the boiling point of water. For example, the blending temperature can be 150° C. or greater. The polymer-modified asphalt can have a second styrene-butadiene copolymer or polystyrene polymer. In some embodiments, the second styrene-butadiene copolymer can have a weight ratio of styrene to butadiene monomer units of 20:80 to 80:20 and can be polymerized at a temperature of less than 40° C.

A method of producing a polymer-modified asphalt emulsion is also disclosed comprising providing an aqueous asphalt emulsion and mixing the asphalt emulsion and an aqueous dispersion of the high temperature polymerized copolymer. In some embodiments, the aqueous dispersion can further include a second styrene-butadiene copolymer or polystyrene polymer, for example, a copolymer having a weight ratio of styrene to butadiene monomer units of 20:80 to 80:20 and polymerized at a temperature of less than 40° C. In some embodiments, the aqueous dispersion of the copolymer (optionally including the second styrene-butadiene copolymer or polystyrene polymer) can be agglomerated to increase the solids content.

The copolymer described herein can provide both the desired performance and viscosity for use in hot mix asphalt systems. The copolymer can be used alone or blended with other styrene-butadiene copolymers or polystyrene polymers in either cured or uncured systems. Furthermore, curing the copolymer produces only a minimal increase in viscosity when used in hot mix asphalt systems. The copolymer when used in asphalt emulsions imparts excellent elastic recovery and sweep performance to asphalt residues recovered from the emulsions that have been modified by the copolymer.

DETAILED DESCRIPTION

As described herein, the copolymer is made using a high temperature method by polymerizing monomers comprising styrene and optionally butadiene (i.e., 1,3-butadiene) at a temperature of 40° C. or greater. In some embodiments, the monomers include butadiene resulting in a styrene-butadiene copolymer comprising styrene and butadiene monomer units. The weight ratio of styrene to butadiene monomers used in the polymerization of the copolymer can be from 1:99 to 100:0, from 1:99 to 99:1, or from 20:80 to 80:20. The weight ratio can be 25:75 or greater, 30:70 or greater, 35:65 or greater, or 40:60 or greater. The weight ratio can be 70:30 or less, 60:40 or less, 50:50 or less, 40:60 or less, or 30:70 or less. In some embodiments, the weight ratio of styrene to butadiene monomer units in the copolymer is 25:75.

The copolymer can be derived from only styrene, butadiene and acid monomers or can be derived from other monomers, i.e., include other monomer units. In some embodiments, the copolymer includes 20% or less, 15% or less, or 10% or less by weight of other monomer units. For example, the copolymer can include at least one additional conjugated diene monomer (e.g., isoprene) or natural rubber. The copolymer can also include at least one additional vinyl aromatic monomer such as α-methylstyrene or o-chlorostyrene. Other suitable monomers include acrylonitrile, methacrylonitrile, acrylamide, and methacrylamide. In some embodiments, the one or more additional monomers can include at least one (meth)acrylic acid ester. For example, methyl, ethyl, n-butyl, isobutyl and 2-ethylhexyl acrylates and methacrylates can be used.

The copolymer can also include crosslinking monomers such as divinylbenzene. The crosslinking monomers when used in the copolymer can be present in an amount of from 0.2 to 5% and are considered part of the total amount of monomers used in the copolymer.

The copolymer includes acid monomer units. The copolymer can, in some embodiments, include 20% or less, 15% or less, 10% or less, 5% or less, 4% or less, 3% or less, 2% or less, 1.5% or less, 1% or less, or 0.5% or less of one or more acid monomers such as itaconic acid, fumaric acid, acrylic acid, methacrylic acid, and mixtures thereof.

In some embodiments, the copolymer includes only styrene, butadiene and acid monomer units, and optionally divinylbenzene monomer units. In some embodiments, the copolymer includes only styrene, butadiene, acid and acrylonitrile monomer units, and optionally divinylbenzene monomer units. In some embodiments, the copolymer can have a $T_g$ of greater than −80° C. and less than 100° C., or of greater than −80° C. and less than 0° C.

As the copolymer is produced by high temperature polymerization, the copolymer includes more cis-1,4 butadiene units than cold polymerization styrene-butadiene copolymers. In some embodiments, the copolymer can include cis-1,4 butadiene units in an amount greater than 20% and trans-1,4 butadiene units in an amount less than 60% of the total number of butadiene units in the copolymer. In some embodiments, the copolymer can include cis-1,4 butadiene units in an amount greater than 30% and trans-1,4 butadiene units in an amount less than 55% of the total number of butadiene units in the copolymer.

In some examples, the copolymer can be crosslinked or cured (i.e., vulcanized) using a sulfur curing agent as described in more detail herein. Additional crosslinking or curing agents and/or crosslinking monomers can be used such as divinylbenzene; 1,4-butanediol diacrylate; methacrylic acid anhydride; monomers containing 1,3-diketo groups (e.g., acetoacetoxyethyl(meth)acrylate or diacetonacrylamide); and monomers containing urea groups (e.g., ureidoethyl (meth)acrylate, acrylamidoglycolic acid, and methacrylamidoglycolate methyl ether); and silane crosslinkers (e.g., vinyl triethoxysilane, 3-methacryloxypropyl trimethoxysilane and 3-mercaptopropyl trimethoxysilane). Additional examples of crosslinkers include epoxy functionalized (meth)acrylate monomers (e.g., glycidyl methacrylate), N-alkylolamides of α,β-monoethylenically unsaturated carboxylic acids having 3 to 10 carbon atoms and esters thereof with alcohols having 1 to 4 carbon atoms (e.g., N-methylolacrylamide and N-methylolmethacrylamide); glyoxal based crosslinkers; monomers containing two vinyl radicals; monomers containing two vinylidene radicals; and monomers containing two alkenyl radicals. Exemplary crosslinking monomers include diesters or triesters of dihydric and trihydric alcohols with α,β-monoethylenically unsaturated monocarboxylic acids (e.g., di(meth)acrylates, tri(meth) acrylates), of which in turn acrylic acid and methacrylic acid can be employed. Examples of such monomers containing two non-conjugated ethylenically unsaturated double bonds are alkylene glycol diacrylates and dimethacrylates, such as ethylene glycol diacrylate, 1,3-butylene glycol diacrylate, 1,4-butylene glycol diacrylate and propylene glycol diacrylate, vinyl methacrylate, vinyl acrylate, allyl methacrylate, allyl acrylate, diallyl maleate, diallyl fumarate and methylenebisacrylamide. In some examples, copolymers can include from 0 to 5% by weight of one or more crosslinking monomers.

The copolymer can be provided in an aqueous dispersion. The copolymer dispersion can include one or more natural or synthetic anionic surfactants. The copolymer dispersion can have a solids content of 30% to 75%. The dispersion can have a solids content of 30% or greater, 35% or greater, 40% or greater, 45% or greater, 50% or greater, 55% or greater, 60% or greater, or 65% or greater. The polymer dispersion can have an average particle size of 200 nm or less or 100 nm or less (e.g., 20-100 nm). The copolymer dispersion can have an overall anionic charge. In some embodiments, the copolymer dispersion can be "flipped" to modify the charge of the copolymer dispersion to have an overall cationic charge by adding one or more cationic surfactants. Suitable cationic surfactants include, for example, REDICOTE® E-5 (Akzo Nobel, Chicago, Ill.), REDICOTE® E-11 (Akzo Nobel, Chicago, Ill.), REDICOTE® E-53 (Akzo Nobel, Chicago, Ill.), REDICOTE® E-606 (Akzo Nobel, Chicago, Ill.), REDICOTE® E-5127 (Akzo Nobel, Chicago, Ill.), ADOGEN® 477HG (Chemtura Corp., Greenwich, Conn.), INDULIN® W-1 (MeadWestvaco, Charleston, S.C.), INDULIN® W-5 (MeadWestvaco, Charleston, S.C.), INDULIN® SBT (MeadWestvaco, Charleston, S.C.), and INDULIN® MQK (MeadWestvaco, Charleston, S.C.). A non-ionic surfactant can also be used with the cationic surfactant. Suitable non-ionic surfactants include the TETRONIC™ and PLURONIC™ series of ethylene oxide-propylene oxide block copolymer surfactants sold by BASF Corporation, nonyl phenol ethoxylates, octyl-phenol ethoxylates, dodecyl phenol ethoxylates, linear alcohol ethoxylates, branched alcohol ethoxylates such as tridecyl alcohol ethoxylates, alcohol ethoxylates, block copolymers, PEG esters and castor oil ethoxylates.

The copolymer can be provided in an aqueous dispersion with at least one additional styrene-butadiene copolymer or polystyrene polymer, for example, by mixing a first aqueous dispersion including the high temperature polymerized copolymer described above with a second aqueous dispersion including the additional styrene-butadiene copolymer or polystyrene polymer. In some embodiments, at least one of the surfactants present in the first copolymer dispersion is the same as at least one of the surfactants in the second styrene-butadiene copolymer or polystyrene dispersion. In some embodiments where the copolymers are to be cured, the first copolymer dispersion and the second styrene-butadiene copolymer or polystyrene dispersion can be mixed prior to curing or one or both of the individual copolymer dispersions can be cured prior to mixing. In some embodiments where the copolymer dispersions are to be agglomerated, the first copolymer dispersion and the second styrene-butadiene copolymer or polystyrene dispersion can be mixed prior to agglomeration or one or both of the individual copolymer dispersions can be agglomerated prior to mixing. Further, in some embodiments where the copolymer dispersions are to be flipped, the first copolymer dispersion and the second styrene-butadiene copolymer or polystyrene dispersion can be mixed prior to flipping or both of the individual polymer dispersions can be flipped prior to mixing.

The additional styrene-butadiene copolymer or polystyrene can be polymerized at a high temperature or can be polymerized at a low temperature at less than 40° C., e.g., at 5 to 25° C. In some embodiments, the additional polymer can be a styrene-butadiene copolymer polymerized at a low temperature. The additional styrene-butadiene copolymer can have a styrene to butadiene monomer weight such as those described above for the high temperature copolymers described herein. The additional styrene-butadiene copolymer can also include additional monomers such as those described above for the high temperature copolymers described herein, although low temperature SBR's will typically not include acid monomer units. In some examples, the additional styrene-butadiene copolymer can be crosslinked or cured using a sulfur curing agent. The additional styrene-butadiene copolymer can include cis-1,4 butadiene units in an amount less than 20% and trans-1,4 butadiene units in an amount greater than 60% of the total number of butadiene units in the copolymer.

The high temperature polymerized copolymer can be prepared by polymerizing the styrene monomers, the optional butadiene monomers, and the acid monomers in an aqueous emulsion polymerization reaction at a temperature greater than 40° C., greater than 50° C., or greater than 60° C. or at a temperature less than 100° C., less than 90° C. or less than 80° C. The high temperature polymerized copolymer can be produced using either a continuous, semi-batch (semi-continuous) or batch process. In some examples, the high temperature polymerized copolymer is produced using a continuous method by continuously feeding one or more monomer streams, a surfactant stream and an initiator stream to one or more reactors. The monomers in the one or more monomer streams can be fed at the desired butadiene to styrene weight ratio. A seed latex can also be initially charged to the reactor. In some embodiments, the polymerizing method using the high temperature polymerized copolymer can be produced using a single stage polymerization, e.g., through the use of a single reactor. In addition, uniform copolymer particles can be produced (and not block copolymers). In some embodiments, the polymerization method is performed in the absence of organic solvents such as N-methylpyrrolidone.

The surfactant stream includes a surfactant and water and can, in some embodiments, be combined with the initiator stream. The surfactant in the emulsion stream can be a synthetic or natural surfactant. For example, the surfactant can be a natural surfactant such as sodium or potassium oleate or the sodium or potassium salt of rosin acid. The surfactant can be present in the reactor in an amount from 0.5 to 5 weight percent, based on total monomer weight.

At a polymerization temperature of 70° C. or greater, a thermal initiator can be used in the reactor such as ammonium persulfate, potassium persulfate, or sodium persulfate. At temperatures of less than 70° C., the thermal initiator can be combined with or replaced by a redox initiator comprising a free radical generator, a reducing agent and an activator (e.g., a water-soluble metal salt).

Suitable free radical generators include organic peroxygen compounds such as benzoyl peroxide, hydrogen peroxide, di-t-butyl peroxide, dicumyl peroxide, 2,4-dichlorobenzoyl peroxide, decanoyl peroxide, lauroyl peroxide, diisopropylbenzene hydroperoxide, cumene hydroperoxide, p-methane hydroperoxide, α-pinene hydroperoxide, t-butyl hydroperoxide, acetyl acetone peroxide, methyl ethyl ketone peroxide, succinic acid peroxide, dicetyl peroxydicarbonate, t-butyl peroxyacetate, t-butyl peroxymaleic acid, t-butyl peroxybenzoate, and the like; and alkyl perketals, such as 2,2-bis-(t-butylperoxy)butane, ethyl 3,3-bis(t-butylperoxy)butyrate, or 1,1-di-(t-butylperoxy) cyclohexane. In some embodiments, the free radical generator includes diisopropylbenzene hydroperoxide or p-methane hydroperoxide. The free radical generator is typically present in an amount between 0.01 and 2% by weight or 0.01 and 1% by weight based on total monomer weight.

Suitable reducing agents for use in the initiator stream include sulfur dioxide; alkali metal disulfites; alkali metal and ammonium hydrogen sulfites; thiosulfate, dithionite and formaldehyde sulfoxylates; hydroxylamine hydrochloride; hydrazine sulfate; glucose and ascorbic acid. For example, the reducing agent can include sodium formaldehyde sulfoxylate dihydrate (SFS), sodium metabisulfite, or a mixture thereof. The reducing agent can be present in an amount between 0.01 and 1% by weight based on total monomer weight. In addition, the weight ratio of reducing agent to free radical generator can be between 0.2:1 and 1:1.

The water-soluble metal salt can be an iron, copper, cobalt, nickel, tin, titanium, vanadium, manganese, chromium or silver salt and can be chosen from a wide variety of water-soluble metal salts. Suitable water-soluble metal salts include copper (II) amine nitrate, copper (II) metaborate, copper (II) bromate, copper (II) bromide, copper perchlorate, copper (II) dichromate, copper (II) nitrate hexahydrate, iron (II) acetate, iron (III) bromide, iron (III) bromide hexahydrate, iron (II) perchlorate, iron (III) dichromate, iron (III) formate, iron (III) lactate, iron (III) malate, iron (III) nitrate, iron (III) oxalate, iron (II) sulfate pentahydrate, cobalt (II) acetate, cobalt (II) benzoate, cobalt (II) bromide hexahydrate, cobalt (III) chloride, cobalt (II) fluoride tetrahydride, nickel hypophosphite, nickel octanoate, tin tartrate, titanium oxalate, vanadium tribromide, silver nitrate, and silver fluosilicate. The metal can also be complexed with a compound, such as ethylenediaminetetraacetic acid (EDTA) to increase its solubility in water. For example, iron/EDTA complexes or cobalt/EDTA complexes can be used. The water-soluble metal salt can be present in an amount less than 0.01% by weight based on total monomer weight.

The polymerization reaction can be conducted in the presence of molecular weight regulators to reduce the molecular weight of the copolymer. Suitable molecular weight regulators include C8 to C12 mercaptans, such as octyl, nonyl, decyl or dodecyl mercaptans. In some embodiments, tert-dodecyl mercaptan is used as a molecular weight regulator. The amount of tert-dodecyl mercaptan used will depend upon the molecular weight that is desired for the copolymer. In some embodiments, the amount of molecular weight regulator is from 0.01 and 4% by weight (e.g., 0.1 to 1% by weight) based on total monomer weight.

The one or more monomer feeds, surfactant feed and initiator feed can be separately fed to a reactor where polymerization of the styrene and butadiene monomers occurs. The total amount of water in the reactors can be 60-75% by weight based on total monomer weight. The emulsion polymerization reaction normally produces between 60% and 80% conversion of the styrene and butadiene monomers into the copolymer particles.

Once the desired level of conversion is reached, the polymerization reaction can be terminated by the addition of a shortstop to the reactor. The shortstop reacts rapidly with free radicals and oxidizing agents, thus destroying any remaining initiator and polymer free radicals and preventing the formation of new free radicals. Exemplary shortstops include organic compounds possessing a quinonoid structure (e.g., quinone) and organic compounds that may be oxidized to a quinonoid structure (e.g., hydroquinone), optionally combined with water soluble sulfides such as hydrogen sulfide, ammonium sulfide, or sulfides or hydrosulfides of alkali or alkaline earth metals; N-substituted dithiocarbamates; reaction products of alkylene polyamines with sulfur, containing presumably sulfides, disulfides, polysulfides and/or mixtures of these and other compounds; dialkylhydroxylamines; N,N'-dialkyl-N,N'-methylenebishydroxylamines; dinitrochlorobenzene; dihydroxydiphenyl sulfide; dinitrophenylbenzothiazyl sulfide; and mixtures thereof. In some embodiments, the shortstop is hydroquinone or potassium dimethyl dithiocarbamate. The shortstop can be added in an amount between 0.01 and 0.1% by weight based on total monomer weight. However, the high temperature polymerization can be allowed to continue until complete monomer conversion, i.e., greater than 99%, in which case a shortstop may not be employed.

As mentioned above, the high temperature polymerized copolymer can also be produced using a batch process. In the batch process, the monomers, the surfactant, the free radical generator and water are all added to a reactor and agitated. After reaching the desired polymerization temperature, an activator solution if desired, that includes the reducing agent and the water soluble metal salt if desired can be added to initiate polymerization.

If a semi-batch process is used, the monomers, the surfactant in an aqueous solution, and the free radical generator in an aqueous solution are all fed to a reactor over a period of time, usually from 3 to 9 hours or 3 to 6 hours. If desired, an activator solution that includes a reducing agent and/or a water soluble metal salt can also be added in the reactor prior to commencing the other feeds or can be fed over a time interval to the reactor. The high temperature polymerized copolymer is preferably allowed to complete monomer conversion, i.e., greater than 99%, in which case a shortstop may not be employed. However, a shortstop, if desired, can be added to terminate the polymerization if the desired conversion level is less than 99%.

Once polymerization is terminated (in either the continuous, semi-batch or batch process), the unreacted monomers can be removed from the latex dispersion. For example, butadiene monomers can be removed by flash distillation at atmospheric pressure and then at reduced pressure. The styrene monomers can be removed by steam stripping in a column. The resulting co-polymer dispersion at this point typically has a solids content of less than 60%.

The copolymer dispersion can be agglomerated, e.g., using chemical, freeze or pressure agglomeration, and water removed to produce a solids content of greater than 50% to 75%. In some embodiments, the solids content is 55% or greater, 60% or greater, or 65% or greater. As described above, the high temperature copolymer dispersion can be blended with an additional styrene-butadiene copolymer dispersion prior to agglomeration. The agglomerated particles result in a polymer dispersion of larger particles with a broader particle size distribution. The agglomerated particles as described herein have a particle size of 100 nm to 5 μm. For example, the particle size can range from 100 nm to 2 μm or from 200 nm to 1 μm.

The co-agglomerated dispersion, even once concentrated, can have a viscosity that allows it to readily flow (i.e., it does not gel). For example, an aqueous dispersion having a solids content greater than 60% can have a viscosity of less than 1000 cp at 20° C. The agglomeration of the high temperature polymerized copolymer dispersion can be performed when the copolymer dispersion is in anionic form (prior to flipping).

An antioxidant can be added to the latex dispersion to prevent oxidation of the double bonds of the polymer, and can either be added before or after vulcanization of the latex. The antioxidants can be substituted phenols or secondary aromatic amines. Exemplary substituted phenols include 2,6-di-t-butyl-p-cresol (DBT); 4,4'-thiobis(6-t-butyl-m-cresol); 3-t-butyl-4-hydroxyanisole (3-BHT); 2-t-butyl-4-hydroxyanisole (2-BHT); 2,2-methylenebis(4-methyl-6-t- butylphenol) (MBMBP); 2,2-methylenebis(4-ethyl-6-t-butylphenol) (MBEBP); 4,4'-butylidenebis(3-methyl-6-t-butylphenol) (SBMBP); 2,2-ethylidenebis(4,6-di-t-butylphenol); 2,6-di-t-butyl-4-sec-butylphenol; styrenated phenol; styrenated-p-cresol; 1,1,3-tris(2-methyl-4-hydroxy-5-t-butylphenol)butane; tetrakis[methylene-3-(3,5-di-t-butyl-4-hydroxyphenol)propionate]methane; n-octadecyl-3-(4-hydroxy-3,5-di-t-butylphenyl)propionate; triethylene glycol bis[3-(3-t-butyl-5-methyl-4-hydroxy-phenyl)propionate]; 1,3,5-trimethyl-2,4,6-tris(3,5-di-t-butyl-4-hydroxybenzyl)benzene; 2,2'-dihydroxy-3,3'-di(α-methylcyclohexyl)-5,5'-dimethyldiphenyl methane; 4,4-methylenebis(2,6-di-t-butylphenol); tris(3,5-di-t-butyl-4-hydroxyphenol); tris(3,5-di-t-butyl-4-hydroxyphenyl)isocyanurate; 1,3,5 tris (3',5'-di-t-butyl-4-hydroxybenzoyl)isocyanurate; bis[2-methyl-4-(3-n-alkylthiopropionyloxy)-5-t-butylphenyl]sulfide; 1-oxy-3-methylisopropylbenzene; 2,5-dibutylhydroquinone; 2,2'-methylenebis(4-methyl-6-nonylphenol); alkylated bisphenol; 2,5-di-t-amylhydroquinone; poly-butylated bisphenol-A; bisphenol-A; 2,6-di-t-butyl-p-ethylphenol; 2,6-bis(2'-hydroxy-3-t-butyl-5'-methylbenzyl)-4-methylphenol; 1,3,5-tris(4-t-butyl-3-hydroxy-2,6-dimethylbenzyl)isocyanurate; terephthaloyl-di(2,6-dimethyl-4-t-butyl-3-hydroxybenzyl sulfide); 2,6-t-butylphenol; 2,6-di-t-butyl-2-dimethylamino-p-cresol; 2,2'-methylenebis(4-methyl-6-cyclohexylphenol); hexamethylene glycol bis(3,54-butyl-4-hydroxyphenyl)propionate; (4-hydroxy-3,5-di-t-butylanilino)-2,6-bis(octylthio)-1,3,5-triazine; 2,2-thio[diethyl-bis-3-(3,5-di-t-butyl-4-hydroxyphenyl)propionate]; N,N'-hexamethylene(3,5-di-t-butyl-4-hydroxycinnamide); 3,5-di-t-butyl-4-hydroxybenzylphosphoric acid diethyl ester; 2,4-dimethyl-6-t-butylphenol; 4,4'-methylenebis(2,6-di-t-butylphenol); 4,4'-thiobis(2-methyl-6-t-butylphenol); tris[2-(3,5-di-t-butyl-4-hydroxyphenyl)propionyloxyethyl]isocyanurate; 2,4,6-tributylphenol; bis[3,3-bis(4'-hydroxy-3'-t-butylphenyl)butyric acid]glycol ester; 4-hydroxymethyl-2,6-di-t-butylphenol; and bis(3-methyl-4-hydroxy-5-t-butylbenzyl)sulfide. Exemplary secondary aromatic amines include N-phenyl-N'-isopropyl-p-phenylenediamine; N-phenyl N'-(1,3-dimethylbutyl)-p-phenylenediamine; N,N'-diphenyl-p-phenylenediamine; dioctyl-diphenylamine; dibetanaphthyl-p-phenylenediamine; 2,2,4-trimethyl-1,2-dihydroquinoline polymer and diaryl-p-phenylenediamine. In addition, sulfur containing antioxidants such as dilauryl thiodipropionate, distearyl thiodipropionate and 2-mercaptobenzimidazole; phosphorus containing antioxidants such as distearylpentaerythritol diphosphite; nickel containing antioxidants such as nickel diiso-butyldithiocarbamate, nickel dimethyldithiocarbamate and nickel di-n-butyldithiocarbamate; 2-mercaptotoluimidazole; zinc 2-mercaptotoluimidazole; and 1,11-(3,6,9-trioxaundecyl)bis-3-(dodecylthio)propionate can be used. The antioxidant can be provided in an amount from 0.1 to 5.0 percent or from 0.5 to 2.0 percent by weight based on the weight of the copolymer.

Antiozonants can also be added to the copolymer dispersion to prevent ozone present in the atmosphere from cracking the copolymer, by cleaving the double bonds of the copolymer. Typical antiozonants include waxes (e.g., VANWAX™ H commercially available from R. T. Vanderbilt Co., Inc.) and N,N'-alkylaryl, N—N' dialkyl and N,N'-diaryl derivatives of p-phenylenediamine such as N,N'-di(2-octyl)-p-phenylenediamine, N,N'-di-3(5-methylheptyl)-p-phenylenediamine, N-(1,3-dimethylbutyl)-N'-phenyl-p-phenylenediamine (e.g., ANTOZITE™ 67P commercially available from R. T. Vanderbilt Co., Inc.), N-isopropyl-N'-phenyl-p-phenylenediamine, and N-cyclohexyl-N'-phenyl-p-phenylenediamine. The antiozonants can be provided in an amount from 0.5 to 10 percent, from 1 to 5 percent, or from 1.5 to 3 percent, by weight based on the weight of the copolymer.

Prevulcanization inhibitors can also be added to the copolymer dispersion to prevent premature vulcanization or scorching of the polymer. For example, N-cyclohexylthiophthalimide; phthalic anhydride; N-cyclohexyl-thiophthalimide; N-phenyl-N-(trichloromethyl sulfenyl)-benzene sulfonamide; bis-(sulfonamido)-sulfides or polysulfides (e.g., bis-(N-methyl-p-toluenesulfonamido)-disulfide); substituted thiophosphoramides (e.g., N-cyclohexylthio-N-phenyldiethylphosphoramide); N-(sulfenyl)methacrylamides; thio-substituted-1,3,5-triazine, -diamine or -triamines; 2-(thioamino)-4,6-diamino-1,3,5-triazines; N,N'-substituted bis-(2,4-diamino-s-triazin-6-yl)-oligosulfides; and substituted thioformamidines can be used as prevulcanization inhibitors. In some embodiments, the prevulcanization inhibitor is N-cyclohexylthio-phthalimide (SANTOGARD™ PVI commercially available from Flexsys) or N-phenyl-N-(trichloromethyl sulfenyl)benzene sulfonamide (VULKALENT™ E commercially available from Bayer). The prevulcanization inhibitor is typically provided in an amount from 1 and 5 percent or from 1.5 to 3 percent by weight based on the weight of the polymer.

The copolymer can be vulcanized to crosslink the polymer thereby increasing the tensile strength and elongation of the rubber by heating the copolymer, typically in the presence of vulcanizing agents, vulcanization accelerators, antireversion agents, and optionally crosslinking agents. Exemplary vulcanizing agents include various kinds of sulfur such as sulfur powder, precipitated sulfur, colloidal sulfur, insoluble sulfur and high-dispersible sulfur; sulfur halides such as sulfur monochloride and sulfur dichloride; sulfur donors such as 4,4'-dithiodimorpholine; selenium; tellurium; organic peroxides such as dicumyl peroxide and di-tert-butyl peroxide; quinone dioximes such as p-quinone dioxime and p,p'-dibenzoylquinone dioxime; organic poly-amine compounds such as triethylenetetramine, hexamethylenediamine carbamate, 4,4'-methylenebis(cyclohexylamine) carbamate and 4,4'-methylenebis-o-chloroaniline; alkylphenol resins having a methylol group; and mixtures thereof. In some examples, the vulcanizing agents include sulfur dispersions or sulfur donors. The vulcanizing agent can be present from 0.1 to 15%, from 0.3 to 10%, or from 0.5 to 5%, by weight based on the weight of the polymer.

Exemplary vulcanization accelerators include sulfenamide-type vulcanization accelerators such as N-cyclohexyl-2-benzothiazole sulfenamide, N-t-butyl-2-benzothiazole sulfenamide, N-oxyethylene-2-benzothiazole sulfenamide, N-oxydiethylene-2-benzothiazole sulfenamide, N-oxydiethylene-thiocarbamyl-N-oxydiethylene sulfenamide, N-oxyethylene-2-benzothiazole sulfenamide and N,N'-diisopropyl-2-benzothiazole sulfenamide; guanidine-type vulcanization accelerators such as diphenylguanidine, di-o-tolylguanidine and di-o-tolylbiguanidine; thiourea-type vulcanization accelerators such as thiocarboanilide, di-o-tolylthiourea, ethylenethiourea, diethylenethiourea, dibutylthiourea and trimethylthiourea; thiazole-type vulcanization accelerators such as 2-mercaptobenzothiazole, dibenzothiazyl disulfide, 2-mercaptobenzothiazole zinc salt, 2-mercaptobenzothiazole sodium salt, 2-mercaptobenzothiazole cyclohexylamine salt, 4-morpholinyl-2-benzothiazole disulfide and 2-(2,4-dinitrophenylthio)benzothiazole; thiadiazine-type vulcanization accelerators such as activated thiadiazine; thiuram-type vulcanization accelerators such as tetramethylthiuram monosulfide, tetramethylthiuram disulfide, tetraethylthiuram disulfide, tetrabutylthiuram disulfide and dipentamethylenethiuram tetrasulfide; dithiocarbamic acid-type vulcanization accelerators such as sodium dimethyldithiocarbamate, sodium diethyldithiocarbamate, sodium di-n-butyldithiocarbamate, lead dimethyldithiocarbamate, lead diamyldithiocarbamate, zinc diamyldithiocarbamate, zinc dimethyldithiocarbamate, zinc diethyldithiocarbamate, zinc di-n-butyldithiocarbamate, zinc pentamethylene dithiocarbamate, zinc ethylphenyldithiocarbamate, tellurium diethyldithiocarbamate, bismuth dimethyldithiocarbamate, selenium dimethyldithiocarbamate, selenium diethyldithiocarbamate, cadmium diethyldithiocarbamate, copper dimethyldithiocarbamate, iron dimethyldithiocarbamate, diethylamine diethyldithiocarbamate, piperidinium pentamethylene dithiocarbamate and pipecoline pentamethylene dithiocarbamate; xanthogenic acid-type vulcanization accelerators such as sodium isopropylxanthogenate, zinc isopropylxanthogenate and zinc butylxanthogenate; isophthalate-type vulcanization accelerators such as dimethylammonium hydrogen isophthalate; aldehyde amine-type vulcanization accelerators such as butyraldehyde-amine condensation products and butyraldehyde-monobutylamine condensation products; and mixtures thereof. The vulcanization accelerator can be present within a range of from 0.1 to 15%, from 0.3 to 10%, or from 0.5 to 5%, by weight based on the weight of the polymer.

Antireversion agents can also be included in the vulcanization system to prevent reversion, i.e., an undesirable decrease in crosslink density. Suitable antireversion agents include zinc salts of aliphatic carboxylic acids, zinc salts of monocyclic aromatic acids, bismaleimides, biscitraconimides, bisitaconimides, aryl bis-citraconamic acids, bissuccinimides, and polymeric bissuccinimide polysulfides (e.g., N,N'-xylenedicitraconamides). The antireversion agent can be present in a range of from 0 to 5%, from 0.1 to 3%, or from 0.1 to 2% by weight based on the weight of the polymer.

The above additives (antioxidants, antiozonants, prevulcanization inhibitors, vulcanizing agents, vulcanization accelerators and antireversion agents) can be mixed with the latex dispersion. Crosslinking agents can also be included in the vulcanization system in small amounts to facilitate crosslinking of the polymer chains and are typically organic peroxides. The latex dispersion can be vulcanized at an elevated temperature and pressure and the vulcanization process is well understood by those skilled in the art.

As noted above, the high temperature polymerized copolymer dispersions can be blended with low temperature polymerized styrene-butadiene copolymer dispersions produced at a temperature below 40° C. (e.g., 5° C. to 25° C.). It is noted that the low temperature polymerized styrene-butadiene copolymer dispersions can be produced using the method described above for the high temperature polymerized copolymer dispersions except at lower temperatures.

The high temperature copolymers and dispersions thereof can be used in various applications. For example, the high temperature copolymer can be used in vehicle tires, carpet backing, adhesives, foams, and paper coatings. In some embodiments, the high temperature styrene butadiene copolymers are used in asphalt-based systems such as hot mix asphalt and asphalt emulsions.

In some embodiments, the high temperature copolymer can be used in hot mix asphalt formulations. A polymer-modified hot mix asphalt can be prepared, for example, by blending asphalt and an aqueous dispersion of the high temperature polymerized copolymer at a blending temperature exceeding the boiling point of water. For example, the blending temperature can be 150° C. or greater or 160° C. or greater. The high temperature polymerized copolymer can be blended with a second styrene-butadiene copolymer as discussed herein. The polymer-modified hot mix asphalt composition is substantially free of water and can have, for example, a viscosity of 3000 cp or less, less than 2000 cp, or less than 1500 cp at 135° C. In some embodiments, the addition of the high temperature copolymer, alone or in a blend, to the hot mix asphalt composition can result in an increase in viscosity of less than 125%, less than 100%, less than 75%, or less than 50%. The copolymer can be present in an amount of from 0.5% to 30% based on the total solids content of the copolymer and the asphalt. For example, the copolymer can be present in an amount of 1% or more, 1.5% or more, 2% or more, 2.5% or more, or 3% or more or can be present in an amount of 25% or less, 20% or less, 15% or less, 10% or less, 7.5% or less or 5% or less. In some embodiments, the polymer-modified hot mix asphalt composition can have a viscosity of less than 3000 cp at 135° C. when it includes 3% or more of the copolymer (e.g. 3.5%, 4%, 4.5%, 5%, 5.5% or 6%). In addition, the copolymers described herein have the potential to impart manageable viscosities to hot asphalt (e.g. at 135° C.) up to levels of 20 wt % latex polymer. As noted herein, the high temperature polymerized copolymer can be cured prior to being blended with the asphalt. In some embodiments, the high temperature polymerized copolymer can be blended with the asphalt and then cured. The polymer-modified hot mix asphalt formulations can be used for paving to produce road surfaces or can be used in asphalt shingles.

In some embodiments, the high temperature copolymer can be used in an asphalt emulsion. The polymer-modified asphalt emulsion includes the asphalt and the copolymer dispersed in the water with a surfactant. The polymer-modified asphalt emulsion can be produced by providing an aqueous asphalt emulsion and mixing the asphalt emulsion and an aqueous dispersion of the high temperature copolymer. In some embodiments, the aqueous dispersion can further include a second styrene-butadiene copolymer as described herein. In some embodiments, the aqueous dispersion of the copolymer (optionally including the second styrene-butadiene copolymer) can be agglomerated to increase the solids content. The copolymer can be present in an amount of from 0.5% to 30% based on the total solids content of the copolymer and the asphalt. For example, the copolymer can be present in an amount of 1% or more, 1.5% or more, 2% or more, or 2.5% or more or can be present in an amount of 25% or less, 20% or less, 15% or less, 10% or less, 7.5% or less or 5% or less. The resulting asphalt emulsions can be used, for example, to maintain paved asphalt road surfaces by employing different surface treatments including micro-surfacing.

The following non-limiting examples are now provided. Except where otherwise indicated, percentages are on a per weight basis and solutions are aqueous solutions.

EXAMPLES

Examples 1-4 and Comparative Example 1

|  | Example 1 | Comp. Ex. 1 | Example 2 | Example 3 | Example 4 |
| --- | --- | --- | --- | --- | --- |
| Styrene (pphm) | 25 | 28.1 | 33.9 | 41.9 | 42 |
| Butadiene (pphm) | 71.9 | 71.9 | 63 | 56.2 | 56 |
| Acrylamide (pphm) | 1.9 | 0 | 1.9 | 0 | 0 |
| Itaconic Acid (pphm) | 1.2 | 0 | 1.2 | 1.9 | 1.98 |

-continued

|  | Example 1 | Comp. Ex. 1 | Example 2 | Example 3 | Example 4 |
|---|---|---|---|---|---|
| t-ddm (pphm) | 2.05 | 0 | 1.95 | 2 | 0.94 |
| Initiator (pphm) | 0.85 | 0.85 | 0.85 | 0.7 | 0.95 |
| Polymerization temp. (° C.) | 75 | 75 (initial) 83 (6 hr) | 78 | 82 (initial) 85 (3 hr) 88 (7 hr) | 85 (initial) 90 (4.5 hr) |
| Feed time - monomers (hrs.) | 6 | 6 | 5 | 7 | 4.5 |
| Feed time - initator (hrs.) | 7.5 | 6 | 6.5 | 9.5 | 5.75 |

Latex Preparation Using Hot Polymerization

The monomers listed above (in parts per hundred monomer (pphm)), tert-dodecyl mercaptan (t-ddm), and an aqueous solution of sodium persulfate initiator, were added for the periods provided above to a reactor pre-heated to the polymerization temperature and initially containing water, a polystyrene seed latex, and TRILON BX, an ethylenediaminetetraacetic acid commercially available from BASF Corporation (Florham Park, N.J.). The stabilization of the latex particles during polymerization was accomplished by feeding an aqueous solution of surfactant over the course of the polymerization. The temperature was maintained at the polymerization temperature except as shown. Following the polymerization process, the latex dispersion was stripped of the residual monomers to provide an aqueous dispersion with residual styrene levels of less than 400 ppm.

Latex Polymer-Modified Asphalt Sample Preparation

Asphalt cement was preheated to 160° C.+/−3° C. for at least two hours and then 650 grams of the heated asphalt cement was poured into a metallic can. The asphalt-containing can was heated to 170° C.+/−3° C. using a heating mantle. A blade was inserted at an angle at approximately 20° in the middle of the can to provide optimum mixing. The latex prepared according to the method described above was added slowly to the hot asphalt with mixing at 300-325 rpm. Unless otherwise specified, the amount of latex polymer solids added to the asphalt was 3 wt % based on the total solids content of the latex polymer and asphalt. After each addition, time was allowed for most of the bubbling to cease and then the mixer speed was increased to approximately 400-700 rpm to blend the resulting mixture. After latex addition, the mixing was continued for two additional hours to achieve an equilibrated asphalt polymer mixture. Samples of the polymer modified asphalts were taken for viscosity measurement or poured into molds for any desired testing.

SHRP Binder Testing of Latex Polymer-Modified Asphalt

The Strategic Highway Research Program (SHRP) evaluation of latex polymer modified asphalts was carried out according to the ASTM D7175 or AASHTO T315 procedure on the original latex polymer modified asphalt (SHRP-fresh), on the latex polymer modified asphalt following Rolling Thin-Film Oven (RTFO) exposure, and also on the RTFO conditioned latex polymer modified asphalt that was conditioned in the Pressure Aging Vessel (PAV). The Dynamic Shear Rheometer (DSR) tests measure the dynamic shear modulus and stiffness of the latex polymer modified asphalt. In addition, Bending Beam Rheometer (BBR) testing was carried out according to ASTM D6678 or AASHTO T313 to measure the low temperature stiffness characteristics of the latex polymer modified asphalt binders. Testing of the original (unaged or fresh) latex polymer modified asphalt and of the latex polymer modified asphalt after RTFO exposure provided the High Temperature in the Performance Grade (PG) scale. Testing of the latex polymer modified asphalt after RTFO and PAV exposure provided the stiffness at intermediate temperatures related to fatigue resistance and BBR testing after RTFO and PAV exposure provided the Low Temperature in the PG scale.

Viscosity of Latex Polymer-Modified Asphalt

The viscosities of the latex polymer modified asphalts prepared according to the methods described above were measured according to ASTM D4402 or AASHTO T316 (American Association of State Highway and Transportation Officials).

Asphalt Samples

PARACURE 850 (curing agent with vulcanization accelerator) was added to each of Examples 1-4 and Comparative Example 1 in an amount of 2.1% by weight based on the weight of latex solids. The examples were hot-mixed in an amount of 3% by weight (based on dry latex polymer and dry asphalt) with Nustar 64-22, a commercially available asphalt from NuStar Asphalt Refining LLC (Savannah, Ga.) having a 64-22 performance grade. NuStar 64-22 was provided as the control. Comparative Example 2 is a styrene-butadiene copolymer prepared by cold polymerizing (i.e., at a temperature of 25° C. or lower) styrene and butadiene. The PG grades and viscosities for the asphalts were determined and are provided in Table 1.

TABLE 1

|  | Control | Comp. Ex. 2 | Ex. 1 | Comp. Ex. 1 | Ex. 2 | Ex. 3 | Ex. 4 |
|---|---|---|---|---|---|---|---|
| PG Grades Passed | 64-22 | 76-22 | — | 70-22 | — | — | 76-28 |
| Fresh phase angle @ 70° C. (°) | — | — | 76.8 | 81.1 | 78.8 | 78.1 | 75.7 |
| SHRP Hi grade (fresh) | — | — | 74.7 | 76 | 74.4 | 74.2 | 77.3 |
| SHRP Hi grade (RTFO) | 64 | 76 | 75.5 | 75.6 | 74.8 | 75.0 | 77.5 |
| SHRP Lo grade | −22 | −22 | — | −22 | — | — | −28 |
| Brookfield Viscosity (cps) | 654 | 2158 | 1404 | 1308 | 1225 | 1221 | 1600 |
| Limiting High Temp | 69.5 | 80.7 | 74.7 | 75.6 | 74.4 | 74.2 | 77.3 |

TABLE 1-continued

|  | Control | Comp. Ex. 2 | Ex. 1 | Comp. Ex. 1 | Ex. 2 | Ex. 3 | Ex. 4 |
|---|---|---|---|---|---|---|---|
| Limiting Low Temp (° C.) | −26.4 | −24 | — | −27.5 | — | — | −28.4 |
| Temp Range (° C.) | 95.8 | 104.7 | — | 103.1 | — | — | 105.6 |

As shown in Table 1, the hot polymerized non-carboxylated styrene-butadiene (Comp. Ex. 1) and carboxylated styrene-butadiene (Examples 1-4) copolymer dispersions both had desirable performance for use in polymer-modified asphalt. The asphalt sample including Example 4 for the fresh (unaged) sample had a phase angle at 70° C. of less than 76°, which is desirable, and also had a good performance grade of 76-28. The carboxylated styrene-butadiene copolymer dispersions had viscosities of 1600 cp or less and much less than the viscosity of the cold-polymerized styrene butadiene dispersion (Comp. Ex. 2).

Example 1 and Comparative Example 1 were prepared as described above but with different amounts of PARACURE 850 as set forth in the chart below. The examples were hot-mixed in an amount of 3% by weight with Nustar 64-22. The PG grades and viscosities for the asphalts were determined and are provided in Table 2.

TABLE 2

|  | Comp Ex. 1 | Comp Ex. 1 | Comp Ex. 1 | Comp Ex. 1 | Ex. 1 | Ex. 1 | Ex. 1 | Ex. 1 | Ex. 1 |
|---|---|---|---|---|---|---|---|---|---|
| PARACURE 850 (wt %) | 0 | 1.05 | 2.1 | 4.2 | 0 | 1.05 | 2.1 | 4.2 | 8.4 |
| PG Grades Passed | — | 76-28 | 70-22 | — | — | — | — | — | 76-28 |
| Fresh phase angle @ 70° C. | 82 | 79.2 | 81.1 | 81.7 | 77.8 | 78 | 76.8 | 75.1 | 76 |
| SHRP Hi grade (fresh) | 75.4 | 77.2 | 76 | 75.2 | 73.9 | 74.8 | 74.7 | 76.2 | 76.1 |
| SHRP Hi grade (RTFO) | 76.2 | 76.3 | 75.6 | 75.7 | 74.8 | 75.4 | 75.5 | 75.4 | 76.7 |
| SHRP Lo grade | — | −28 | −22 | — | — | — | — | — | −28 |
| Brookfield Viscosity (cps) | 1071 | 1225 | 1308 | 1075 | 1354 | 1262 | 1404 | 1637 | 1600 |
| Limiting High Temp (° C.) | 75.4 | 76.3 | 75.6 | 75.2 | 73.9 | 74.8 | 74.7 | 75.4 | 76.1 |
| Limiting Low Temp (° C.) | — | −28.2 | −27.5 | — | — | — | — | — | −28.0 |
| Temp Range (° C.) | — | 104.5 | 103.1 | — | — | — | — | — | 104.1 |

Again, as shown in Table 2, the hot polymerized non-carboxylated styrene-butadiene (Comp. Ex. 1) and carboxylated styrene-butadiene (Ex. 1) copolymer dispersions both had desirable performance at different curing agent amounts in polymer-modified asphalt. The non-carboxylated styrene-butadiene copolymer dispersion performed best with 1.05 wt % curing agent, whereas the carboxylated styrene-butadiene copolymer dispersion performed best with 8.4 wt % curing agent. As the use of sulfur curing agent is actually cheaper than the polymer dispersion, the higher curing agent amount can be advantageous. In addition, the carboxylated styrene-butadiene copolymer dispersions generally had low phase angles, which are desirable.

The compositions and methods of the appended claims are not limited in scope by the specific compositions and methods described herein, which are intended as illustrations of a few aspects of the claims and any compositions and methods that are functionally equivalent are intended to fall within the scope of the claims. Various modifications of the compositions and methods in addition to those shown and described herein are intended to fall within the scope of the appended claims. Further, while only certain representative composition materials and method steps disclosed herein are specifically described, other combinations of the composition materials and method steps also are intended to fall within the scope of the appended claims, even if not specifically recited. Thus, a combination of steps, elements, components, or constituents may be explicitly mentioned herein; however, other combinations of steps, elements, components, and constituents are included, even though not explicitly stated. The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of "comprising" and "including" to provide for more specific embodiments and are also disclosed.

What is claimed is:

1. A method of making copolymer dispersion, comprising:
polymerizing styrene, one or more acid monomers, and butadiene in an aqueous medium at a temperature of greater than 60° C. to produce an uncured copolymer; and
mixing a sulfur curing agent with the copolymer, said curing agent allowing the copolymer to cure.

2. The method of claim 1, wherein said polymerizing step includes 10% or less of said one or more acid monomers and said polymerizing step comprises polymerizing styrene and butadiene.

3. The method of claim 1, wherein said polymerizing step includes 5% or less of said one or more acid monomers.

4. The method of claim 1, wherein said polymerizing step includes 3% or less of said one or more acid monomers.

5. The method of claim 1, wherein said one or more acid monomers in said polymerizing step include one or more of itaconic acid, fumaric acid, acrylic acid, and methacrylic acid.

6. The method of claim 1, further comprising the step of curing the copolymer with the sulfur curing agent at a temperature of 150° C. or greater to produce a cured copolymer.

7. The method of claim 6, wherein said curing step comprises curing the copolymer with the sulfur curing agent and a vulcanization accelerator.

8. The method of claim 1, wherein said polymerizing step comprises polymerizing styrene and butadiene in a weight ratio of styrene to butadiene of 20:80 to 80:20.

9. The method of claim 1, wherein said polymerizing step comprises polymerizing styrene and butadiene at a temperature of less than 100° C.

10. The method of claim 1, wherein said polymerizing step comprises polymerizing only styrene, butadiene, and one or more acid monomers.

11. The method of claim 1, wherein said polymerizing step comprises polymerizing styrene, butadiene, one or more acid monomers, and one or more of acrylonitrile and acrylamide.

12. The method of claim 1, wherein said polymerizing step comprises polymerizing styrene and butadiene monomers in the presence of a molecular weight regulator.

13. The method of claim 1, further comprising modifying the copolymer dispersion to have an overall cationic charge by adding a cationic surfactant to the copolymer dispersion.

14. The method of claim 1, wherein the polymerization occurs in a single stage process.

15. A copolymer, comprising styrene and acid monomer units, and butadiene units, wherein the cis-1,4 butadiene units are greater than 20% and the trans-1,4 butadiene units are less than 60% of the total number of butadiene units in the copolymer and wherein said copolymer is polymerized at a temperature of greater than 60° C. and is cured.

16. The copolymer of claim 15, wherein said copolymer includes 10% or less of said acid monomer units.

17. The copolymer of claim 15, wherein the weight ratio of styrene to butadiene monomer units is 20:80 to 80:20.

18. The copolymer of claim 15, wherein said copolymer is derived from only styrene, butadiene, and acid monomers.

19. The copolymer of claim 15, wherein said copolymer is derived from styrene, butadiene, one or more acid monomers, and one or more of acrylonitrile and acrylamide.

20. The copolymer of claim 15, wherein said copolymer is derived from styrene, butadiene, one or more acid monomers, and a molecular weight regulator.

21. A polymer-modified asphalt composition, comprising asphalt; and
the styrene-butadiene copolymer of claim 15.

22. The asphalt composition of claim 21, wherein the composition is substantially free of water.

23. The asphalt composition of claim 22, having a viscosity of less than 2000 cp at 135° C.

24. The asphalt composition of claim 21, further comprising water, wherein the asphalt and the copolymer are dispersed in the water with a surfactant to form an asphalt emulsion.

25. The asphalt composition of claim 21, wherein the copolymer is present in an amount of from 0.5% to 30% based on the total solids content of the copolymer and the asphalt.

26. The asphalt composition of claim 21, further comprising a second styrene-butadiene copolymer having a weight ratio of styrene to butadiene monomer units of 20:80 to 80:20 and polymerized at a temperature of less than 40° C.

27. A method of producing a polymer-modified asphalt, comprising:
blending asphalt and an aqueous dispersion of the styrene-butadiene copolymer of claim 15 at a blending temperature exceeding the boiling point of water.

28. The method of claim 1, wherein the sulfur curing agent is selected from the group consisting of sulfur, sulfur halides, sulfur donors, and mixtures thereof.

* * * * *